(12) United States Patent
Diana (10) Patent No.: US 11,693,170 B2
(45) Date of Patent: Jul. 4, 2023

(54) PROJECTION DISPLAY SYSTEM AND METHOD

(71) Applicant: Lumileds LLC, San Jose, CA (US)

(72) Inventor: Frederic Stephane Diana, Santa Clara, CA (US)

(73) Assignee: Lumileds LLC, San Jose, CA (US)

(*) Notice: Subject to any disclaimer, the term of this patent is extended or adjusted under 35 U.S.C. 154(b) by 0 days.

(21) Appl. No.: 17/496,440

(22) Filed: Oct. 7, 2021

(65) Prior Publication Data

US 2022/0113462 A1    Apr. 14, 2022

Related U.S. Application Data (60) Provisional application No. 63/089,874, filed on Oct. 9, 2020.

(51) Int. Cl.
| | | |
|---|---|---|
| *F21V 8/00* | (2006.01) | |
| *G02F 1/01* | (2006.01) | |
| *G02F 1/13357* | (2006.01) | |

(52) U.S. Cl.
CPC ......... *G02B 6/0038* (2013.01); *G02B 6/0056* (2013.01); *G02B 6/0083* (2013.01); *G02F 1/0136* (2013.01); *G02F 1/13362* (2013.01)

(58) Field of Classification Search
CPC .. G02B 6/0038; G02B 6/0056; G02B 6/0083; G02F 1/0136; G02F 1/13362; G03B 21/006
See application file for complete search history.

(56) References Cited

U.S. PATENT DOCUMENTS

| | | | |
|---|---|---|---|
| 10,146,088 B2* | 12/2018 | Guo | G02F 1/133621 |
| 2010/0283942 A1* | 11/2010 | Murao | G02B 6/0051 |
| | | | 362/606 |
| 2016/0245983 A1* | 8/2016 | Lien | G02B 6/0053 |

* cited by examiner

*Primary Examiner* — Donald L Raleigh
(74) *Attorney, Agent, or Firm* — Schwegman, Lundberg & Woessner, P.A.

(57) ABSTRACT

In a projection display system, a light-emitting diode (LED) can generate unpolarized light. A light guide can receive the unpolarized light from a perimeter of the light guide and guide the unpolarized light between a light emission surface and an opposing surface as guided light. The light guide can include a plurality of light-extraction features that can direct a portion of the guided light out of the light guide through the light emission surface as unpolarized emitted light. A polarizing film can reflect at least some of a first polarization state of the unpolarized emitted light into the light guide through the light emission surface and can transmit at least some of a second polarization state of the unpolarized emitted light through the polarizing film to form a polarized light beam. An angular reduction film can reduce a range of propagation angles of the polarized light beam.

17 Claims, 3 Drawing Sheets

PROJECTION DISPLAY SYSTEM AND METHOD

CROSS-REFERENCE TO RELATED APPLICATION

This application claims the benefit of U.S. Provisional Application No. 63/089,874, filed Oct. 9, 2020, which is hereby incorporated by reference in its entirety.

FIELD OF THE DISCLOSURE

The present disclosure relates to compact illumination using light-emitting diodes (LEDs). Some examples relate to mini-projection devices, used to illuminate internal or external receivers, liquid crystal displays (LCDs), liquid crystal on silicon (LCOS) displays, or other screens.

BACKGROUND OF THE DISCLOSURE

LEDs are used as light sources in projectors. There is ongoing effort to make LED-based projection devices more efficient.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

In a projection display system, a light-emitting diode (LED) can generate unpolarized light. A light guide can receive the unpolarized light from a perimeter of the light guide and guide the unpolarized light between a light emission surface and an opposing surface as guided light. The light guide can include a plurality of light-extraction features that can direct a portion of the guided light out of the light guide through the light emission surface as unpolarized emitted light. A polarizing film can reflect at least some of a first polarization state of the unpolarized emitted light into the light guide through the light emission surface and can transmit at least some of a second polarization state of the unpolarized emitted light through the polarizing film to form a polarized light beam. An angular reduction film can reduce a range of propagation angles of the polarized light beam.

Figure 1:
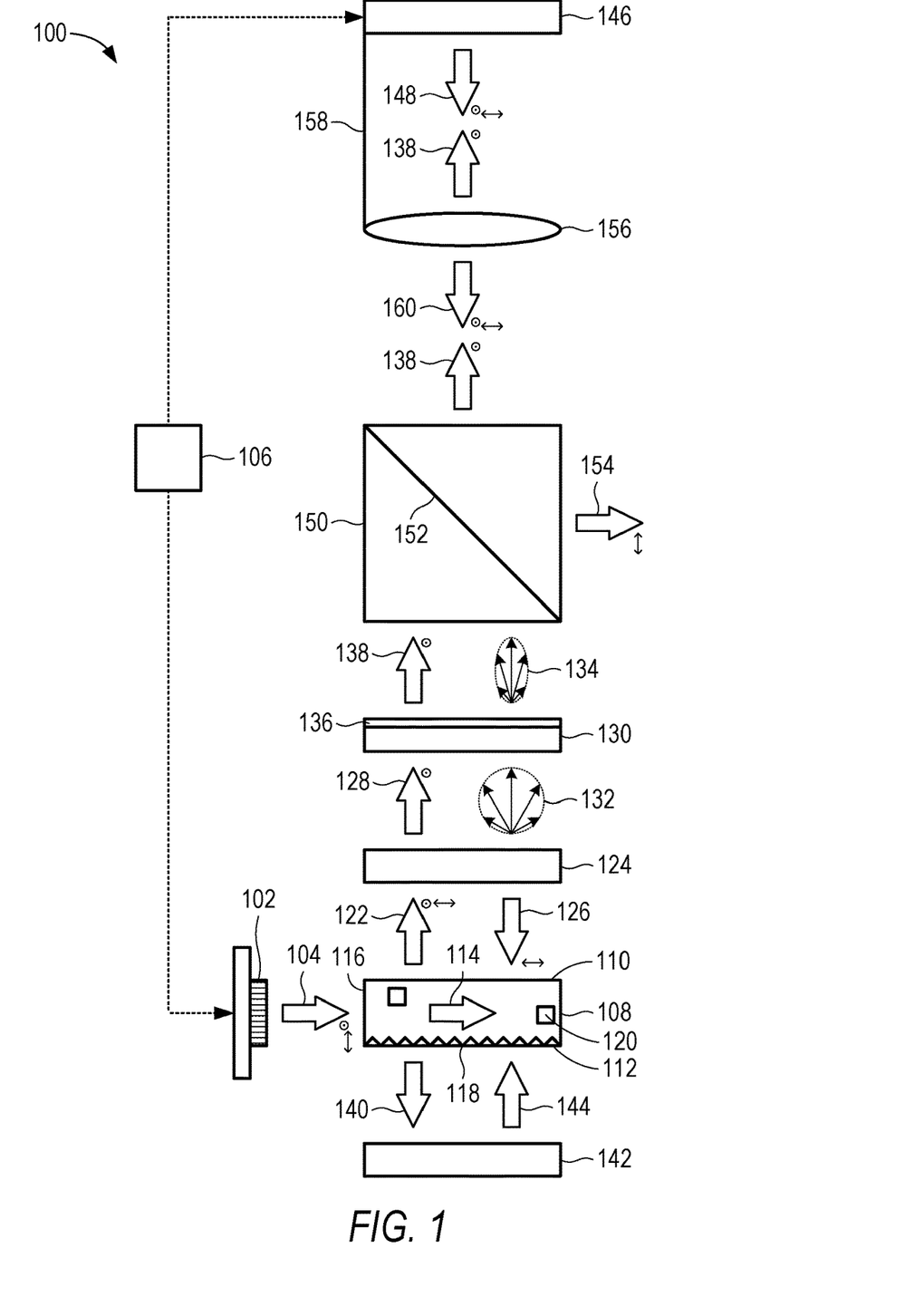
FIG. 1 shows a side view of an example of a portion of a projection display system, in accordance with some examples.

FIG. 1 shows a side view of an example of a portion of a projection display system 100, in accordance with some examples. The projection display system 100 is but one example of a projection display system; other configurations can be used.

The projection display system 100 can include a light-emitting diode (LED) 102 that can generate unpolarized light 104. The LED 102 can be an extended light source, which can emit light over an emission area that is typically significantly larger than a wavelength of the emitted light. For example, an LED 102 can emit light having a wavelength smaller than 1 µm and can have an emission area that can be 1 mm wide, or larger. In contrast, light sources that are not extended light sources can emit light from a point source, or from an area or a virtual area that is sized on the order of the wavelength, such as a laser diode, or a single-mode fiber. In some examples, the LED 102 can be included in an array of LEDs 102. The array of LEDs 102 can optionally be disposed on a single substrate. In other examples, the LEDs 102 can be disposed on different, independent substrates, on which the LEDs 102 are formed. In some examples, each LED 102 in the array can be controlled independently of the other LEDs 102 in the array. For example, an LED 102 can receive a specified current, and in response, can emit light from an emission surface of the LED 102. The emission surface can extend over an emission area. The emission from each location in the emission area can have a Lambertian angular profile (e.g., can vary cosinusoidally as a function of emission angle, with respect to a surface normal of the emission area). The emission can be uniform or substantially uniform from location-to-location across the emission area of an individual LED 102 of the array of LEDs 102. In some examples, the array of LEDs 102 can be an array of white LEDs 102. For example, the array of white LEDs 102 can produce excitation light having an excitation wavelength, which can optionally be in a blue or violet portion of the visible spectrum and can include a phosphor that can absorb some or all of the excitation light and can emit phosphor light at wavelengths that are longer than the excitation wavelength. Other light sources can also be used.

In some examples, the LED 102 can be a first LED that can emit light at a first wavelength. In some examples, the system 100 can further include a second LED that can emit light at a second wavelength different from the first wavelength. In some examples, the system 100 can further include a controller 106 that can electrically power the first LED and the second LED with a selectable power ratio to control a color temperature of light that can be modulated downstream. For example, the controller 106 can present a user interface, such as a graphical user interface or a mechanical user interface, such as a knob or a slider, that can allow a user to select a color temperature of an output of the system 100. As another example, the controller 106 can additionally provide a video signal to a polarization-modulating panel (described in detail below) and can automatically adjust the power ratio to adjust a color balance and/or a color temperature of the output to correspond to one or more colors (or an average color) in the video signal. Other configurations can also be used.

The projection display system 100 can include a light guide 108 that can direct light away from the LED 102. The light guide 108 can be formed from a dielectric material, such as plastic or glass. The light guide 108 can guide light via total internal reflection from one or more surfaces of light guide 108. Note that reflection from a surface of the light guide 108 can be a condition for when light is considered to be guided by the light guide 108. For example, for a typical lens, for which light refracts via refraction through one or more surfaces of the lens, the lens may not be considered to guide the light.

In some examples, the light guide 108 can be formed as a plate light guide. For example, the light guide 108 can have a light emission surface 110 and an opposing surface 112 opposite the light emission surface 110. The light emission surface 110 can be rectangular, circular, elongated, polygonal, or can have another suitable footprint. In other examples, the light guide 108 can be formed as a rod light guide, or another suitable shape. The light guide 108 can guide the unpolarized light 104 between the light emission surface 110 and the opposing surface 112 as guided light 114.

The light guide 108 can receive the unpolarized light 104 from a perimeter of the light guide 108. In some examples, such as examples in which the light emission surface 110 is rectangular, the light guide 108 can receive the unpolarized light 104 along (e.g., through) an edge 116 of the light guide 108. For example, the edge 116 can extend cylindrically (e.g., can be orthogonal to the light emission surface 110) around the perimeter of the light guide 108. For examples in which the light guide 108 has a rectangular footprint, the edge 116 can optionally extend around four edge sides of the light guide 108. In some examples, the system 100 can include multiple LEDs 102 that can emit light into a same edge 116 of the light guide 108.

Figure 3:
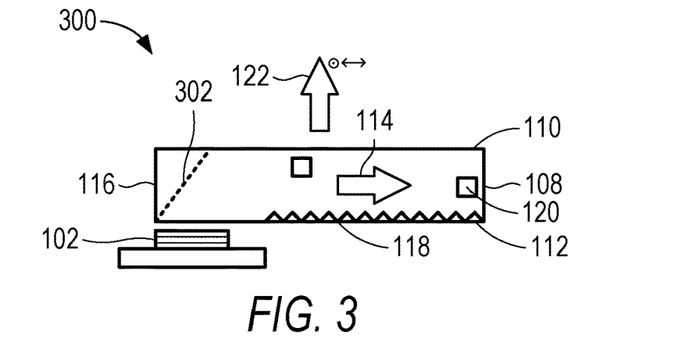
FIG. 3 shows a side view of an example of a projection display system in which the light guide can receive light from the LED from an area at or proximate the perimeter of the light guide, in accordance with some examples.

In other examples, the light guide 108 can receive the unpolarized light 104 through the opposing surface 112 from an area at or proximate the perimeter of the light guide 108. FIG. 3 shows a side view of an example of a projection display system 300 in which the light guide 108 can receive light from the LED 102 from an area at or proximate the perimeter of the light guide 108, in accordance with some examples. In some examples, the light guide 108 can optionally include a bezel 302 or a reflecting portion that can reflect the light away from the perimeter of the light guide 108 toward an interior of the light guide 108. In some examples, the system 100 can include multiple LEDs 102 that can emit light onto the same bezel 302 or reflecting portion.

Returning to FIG. 1, the light guide 108 can include a plurality of light-extraction features, such as light-extraction grooves 118 and/or anisotropic scattering particles 120, that can direct a portion of the guided light 114 out of the light guide 108 through the light emission surface 110 as unpolarized emitted light 122.

In some examples, the plurality of light-extraction features can include a plurality of light-extraction grooves 118 disposed on the opposing surface 112 of the light guide 108. The light-extraction grooves 118 can reflect at least some of the guided light 114 to form at least some of the unpolarized emitted light 122. In some examples, the light-extraction grooves 118 can extend in a direction that is substantially parallel to the edge 116 of the light guide 108. In some examples, a light-extraction groove 118 of the plurality of light-extraction grooves 118 can have a cross-section, taken orthogonal to the direction of the light-extraction grooves 118, that includes a first linear segment that extends to a second linear segment. In some examples, the cross-section can optionally include one or more curved portions.

In some examples, the plurality of light-extraction features can include a plurality of anisotropic scattering particles 120 located within an interior of the light guide 108. The anisotropic scattering particles 120 can anisotropically scatter at least some of the guided light 114 to form at least some of the unpolarized emitted light 122. For example, the anisotropic scattering particles 120 can include spheres, balls, or irregular volumes of a material having a different refractive index than that of the light guide 108. When an individual ray of light strikes an anisotropic scattering particle 120 in the light guide 108, the ray can be redirected via refraction from the interface between the anisotropic scattering particle 120 and the material of the light guide 108. When a full beam of light, formed as a collection of rays that extend over a cross-sectional area of the beam, strikes an anisotropic scattering particle 120, the effect of the anisotropic scattering particle is to randomly scatter or diffuse a portion of the light beam. For example, an incident beam at a single incident angle can scatter to form a scattered beam having a range of exiting angles. For weakly scattering or weakly diffusing anisotropic scattering particles 120, the range of exiting angles can be centered around the incident angle. For more strongly scattering or more strongly diffusing anisotropic scattering particles 120, the range of exiting angles may not necessarily be centered around the incident angle. For example, for strongly scattering or strongly diffusing anisotropic scattering particles 120, the range of exiting angles can extend through a spherical volume (e.g., $4\pi$ steradians) or a half-spherical volume (e.g., $2\pi$ steradians). In general, a degree of scattering (e.g., whether scattering is weak or strong as described above) can depend on refractive indices, shape, size, and other geometry of the anisotropic scattering particles 120.

The projection display system 100 can include a polarizing film 124, which can polarize light without absorbing or wasting a significant amount of the light. The polarizing film 124 can reflect at least some 126 of a first polarization state of the unpolarized emitted light 122 into the light guide 108 through the light emission surface 110. The polarizing film 124 can transmit at least some of a second polarization state, orthogonal to the first polarization state, of the unpolarized emitted light 122 through the polarizing film 124 to form a polarized light beam 128.

Figure 4:
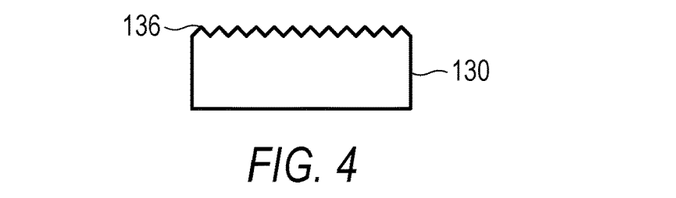
FIG. 4 shows a side view of an example of an angular reduction film, in accordance with some examples.

The projection display system 100 can include an angular reduction film 130 that can reduce a range of propagation angles of the polarized light beam 128 to form a reduced-angle polarized light beam 138. In some examples, the angular reduction film 130 can include a plurality of angular reduction film grooves 136 that extend in a direction that is substantially orthogonal to the edge 116 of the light guide 108. Light rays having particular orientations can reflect via total internal reflection in the grooves to return toward the light guide 108, which can "recycle" some of the light and can therefore narrow the transmitted light without wasting a significant amount of optical power. For example, a range of propagation angles 132 of the light before the angular reduction film 130 can be larger than a corresponding range of propagation angles 134 of the light after the angular reduction film 130. The range can be measured using any suitable metric, such as a full-width-at-half-maximum, a 1/e decrease in intensity, or others. In some examples, the angular reduction film grooves 136 can be located on a surface of angular reduction film 130 that faces away from the light guide 108. In some examples, the angular reduction film 130 can have a surface, opposite the grooves, that is planar, substantially planar, and/or lacking in grooves. FIG. 4 shows a side view (e.g. orthogonal to the view of FIG. 1) of an example of the angular reduction film 130, in accordance with some examples. In the configuration of FIG. 4, each angular reduction film groove 136 of the plurality of angular reduction film grooves 136 can have a cross-section, taken orthogonal to the direction of the angular reduction film grooves 136, that includes a first linear segment that extends to a second linear segment. Other suitable cross-sections can also be used.

Returning to FIG. 1, in some examples, at least some of the guided light 114 can exit the light guide 108 through the opposing surface 112 to form errant light 140. In some of these examples, the projection display system 100 can include a reflector 142 that can reflect at least some of the errant light 140 into the light guide 108 through the opposing surface 112 of the light guide 108. The reflector 142 can include a layer of a reflecting material, such as a metal layer and/or a dielectric film. In some examples, the reflector 142 can occupy a volume directly adjacent to the angular reduction film grooves 136 (e.g., without any intervening optical elements between the reflector 142 and the angular reduction film grooves 136). By reflecting the errant light 140 back into the light guide 108, as reflected errant light 144, the reflector 142 can increase an efficiency of the projection display system 100.

The projection display system 100 can include a polarization-modulating panel 146, such as a liquid crystal display panel. The polarization-modulating panel 146 can include an array of pixels. Each pixel can modulate a polarization state of a corresponding portion of the reduced-angle polarized light beam 138 to form a polarization-modulated beam 148. For example, the pixels can correspond to individual areas of a video or static image. The amount of modulation can vary for a video image or can remain constant or nearly constant over time for a static image. The amount of modulation can correspond to an intensity or a brightness value for each pixel. In some examples, the reduced-angle polarized light beam 138 can illuminate the polarization-modulating panel 146 with light having a first polarization state. The modulation included in the polarization-modulated beam 148 can include a second polarization state that is orthogonal to the first polarization state, where the amount of light in the second polarization state for each pixel can correspond to the intensity or a brightness value for the pixel.

The projection display system 100 can include a polarizer 150 that can convert the polarization-modulated beam 148 to an intensity-modulated beam 154. In some examples, such as the configuration of FIG. 1, the polarization-modulating panel 146 can operate in reflection. For these examples, the polarizer 150 can include a beamsplitter disposed in an optical path between the angular reduction film 130 and the polarization-modulating panel 146. In the configuration of FIG. 1, the polarizer 150 can include a cube beamsplitter, with a polarization-sensitive coating on a hypotenuse 152 of the cube beamsplitter. Other geometries and configurations can also be used.

The projection display system 100 can direct the intensity-modulated beam 154 to a screen, a viewport, or optional projection optical elements that can direct the intensity-modulated beam 154 to a suitable screen or viewport.

The system 100 can further include a lens 156 that can at least partially focus the reduced-angle polarized light beam 138. In some examples, the lens 156 can be a projection lens. In some examples, the lens 156 can produce a slightly diverging beam 160 that can exit the system 100 as the intensity-modulated beam 154. The slightly diverging beam 160 can expand in size (e.g., in cross-sectional size or footprint) as it propagates away from the system 100. The focal length of the lens 156 and the spacing between the polarization-modulating panel 146 and the lens 156 can be selected during a design phase of the system 100, so that the lens 156 can form an image of the polarization-modulating panel 146 at a suitable location, such as at the screen or the viewport.

The system 100 can further include an actuator 158 that can vary a spacing between the lens 156 and the polarization-modulating panel 146 to adjust a focus of the projection display system 100. The actuator 158 can move the lens 156, the polarization-modulating panel 146, or both the lens 156 and the polarization-modulating panel 146. A user and/or the controller 106 can move the actuator 158, or cause the actuator 158 to move manually or automatically (such as via an autofocus mechanism), to vary a distance away from the system 100 at which an image plane occurs. At the image plane, an image of the polarization-modulating panel 146 appears sharp. At increasing distances away from the image plane, the image looks increasingly blurred. Moving the actuator 158 causes the image plane to move closer to or away from the viewing plane.

The controller 106, which can cause an electrical circuit to power the LED 102, can additionally supply a video signal and/or static image signal to the polarization-modulating panel 146. In some examples, the controller 106 can selectively power multiple LEDs 102, such as an array of LEDs 102, where the LEDs 102 can be individually addressable. For example, the controller 106 can specify which light-emitting diodes of the array are electrically powered, how much current is to be delivered to each light-emitting diode, and how such quantities evolve over time. In some examples, the projection display system 100 can optionally include multiple sets of LEDs 102 driven by an LED driver that is controlled by the controller 106, such as a microprocessor. In some examples, the controller 106 can be coupled to an input video signal, which can be generated from a file stored on a server (not shown), or from a camera and sensors (not shown). The controller 106 can operate in accordance with instructions and profiles stored in a memory. In some examples, the system 100 can include modules that allow wirelessly communicating via Bluetooth, Wi-Fi, LTE, or any other communication protocol using RF transceiver circuitry. In some examples, the system 100 may lack the RF transceiver circuitry or otherwise lack the ability to wirelessly communicate with other electronic devices using a communication protocol.

Figure 2:
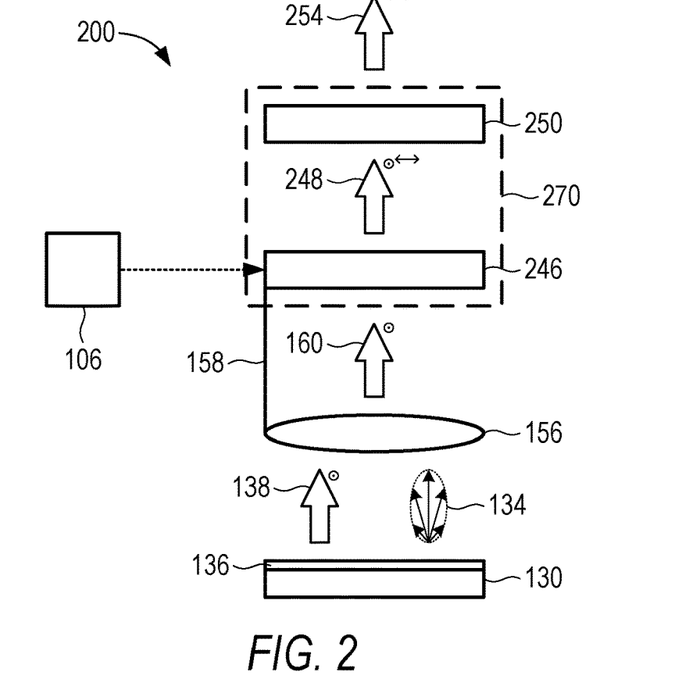
FIG. 2 shows a side view of an example of a portion of a projection display system, in accordance with some examples.

FIG. 2 shows a side view of an example of a portion of a projection display system 200, in accordance with some examples. Whereas the configuration of FIG. 1 shows a projection display system in which the polarization-modulating panel 146 can operate in reflection, FIG. 2 shows a projection display system in which the polarization-modulating panel 246 can operate in transmission. Optical elements upstream from the angular reduction film 130 are the same as those shown in FIG. 1, and are omitted from FIG. 2 for clarity.

The projection display system 200 can include a polarization-modulating panel 246, such as a liquid crystal display panel. The polarization-modulating panel 246 can include an array of pixels. Each pixel can modulate a polarization state of a corresponding portion of the reduced-angle polarized light beam 138 to form a polarization-modulated beam 248. In some examples, the reduced-angle polarized light beam 138 can illuminate the polarization-modulating panel 246 with light having a first polarization state. The modulation included in the polarization-modulated beam 248 can include a second polarization state that is orthogonal to the first polarization state, where the amount of light in the second polarization state for each pixel can correspond to the intensity or a brightness value for the pixel.

The projection display system 200 can include a polarizer 250 that can convert the polarization-modulated beam 248 to an intensity-modulated beam 254. In some examples, the polarizer 250 can be formed as a polarizing sheet. In some examples, the polarization-modulating panel 246 and the polarizer 250 can be disposed directly adjacent to each other and packaged in a housing 270. Other suitable polarizers can also be used.

The projection display system 100 can direct the intensity-modulated beam 254 to a screen, a viewport, or optional projection optical elements that can direct the intensity-modulated beam 254 to a suitable screen or viewport.

Figure 5:
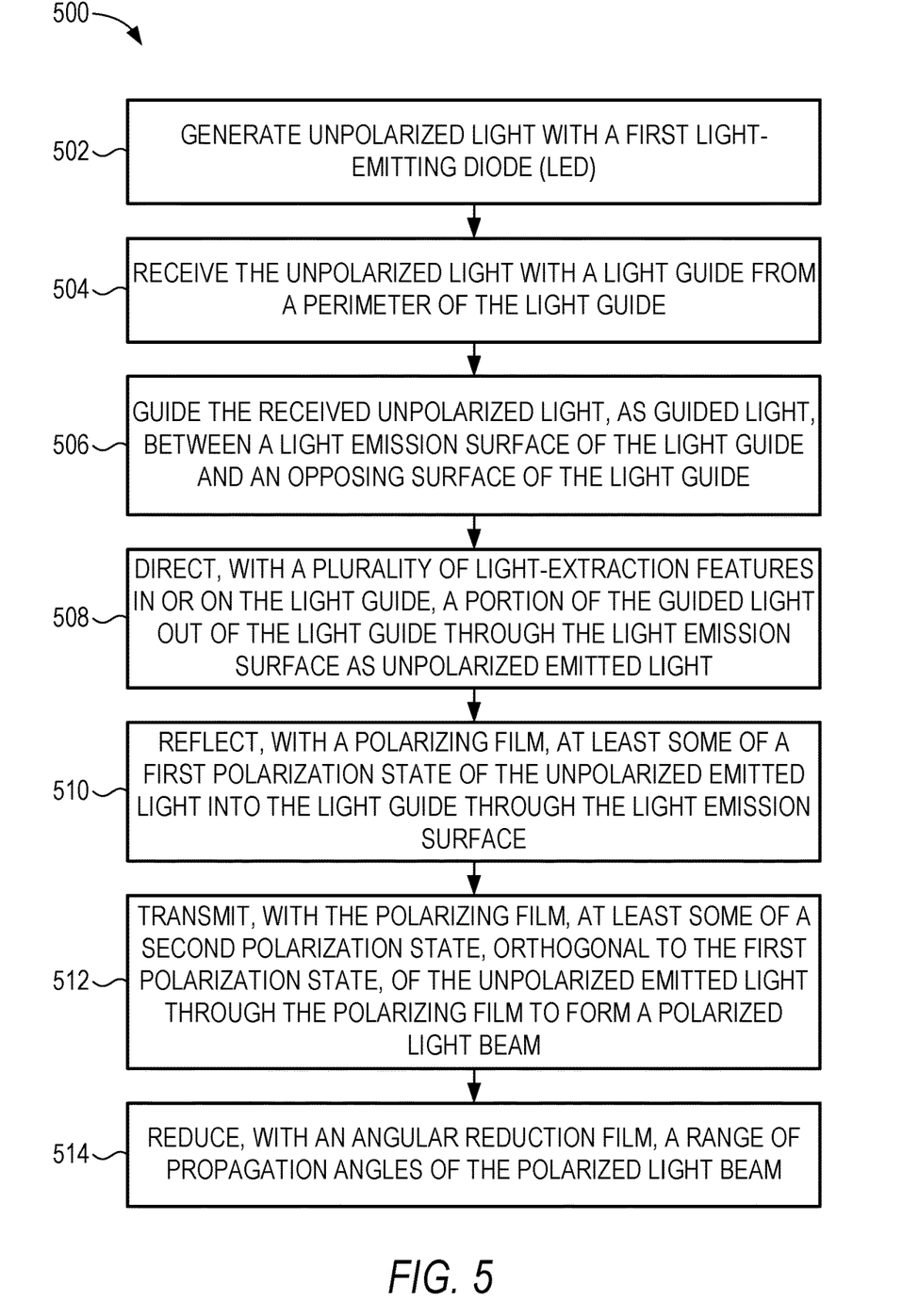
FIG. 5 shows a flow chart of an example of a method for operating a projection display system, in accordance with some examples.

FIG. 5 shows a flow chart of an example of a method 500 for operating a projection display system, in accordance with some examples. The method 500 can be executed by the projection display system 100, or other suitable projection display systems. The method 500 is but one example of a method for operating a projection display system; other suitable methods can also be used.

At operation 502, the projection display system can generate unpolarized light with a first light-emitting diode (LED). In some examples, the LED can be a first LED that emits light at a first wavelength. In some examples, the method can further include emitting, with a second LED, light at a second wavelength different from the first wavelength. In some examples, the method can further include electrically powering, with a controller, the first LED and the second LED with a selectable power ratio to control a color temperature of the polarized light beam.

At operation 504, the projection display system can receive the unpolarized light with a light guide from a perimeter of the light guide.

At operation 506, the projection display system can guide the received unpolarized light, as guided light, between a light emission surface of the light guide and an opposing surface of the light guide.

At operation 508, the projection display system can direct, with a plurality of light-extraction features in or on the light guide, a portion of the guided light out of the light guide through the light emission surface as unpolarized emitted light.

At operation 510, the projection display system can reflect, with a polarizing film, at least some of a first polarization state of the unpolarized emitted light into the light guide through the light emission surface.

At operation 512, the projection display system can transmit, with the polarizing film, at least some of a second polarization state, orthogonal to the first polarization state, of the unpolarized emitted light through the polarizing film to form a polarized light beam.

At operation 514, the projection display system can reduce, with an angular reduction film, a range of propagation angles of the polarized light beam.

While exemplary embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

It will thus be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

To further illustrate the systems and related methods disclosed herein, a non-limiting list of examples is provided below. Each of the following non-limiting examples can stand on its own or can be combined in any permutation or combination with any one or more of the other examples.

In Example 1, a projection display system can include: a light-emitting diode (LED) configured to generate unpolarized light; a light guide having a light emission surface and an opposing surface opposite the light emission surface, the light guide configured to receive the unpolarized light from a perimeter of the light guide and guide the unpolarized light between the light emission surface and the opposing surface as guided light, the light guide including a plurality of light-extraction features that are configured to direct a portion of the guided light out of the light guide through the light emission surface as unpolarized emitted light; a polarizing film configured to: reflect at least some of a first polarization state of the unpolarized emitted light into the light guide through the light emission surface; and transmit at least some of a second polarization state, orthogonal to the first polarization state, of the unpolarized emitted light through the polarizing film to form a polarized light beam; and an angular reduction film configured to reduce a range of propagation angles of the polarized light beam.

In Example 2, the projection display system of Example 1 can optionally be configured such that: the light guide is configured to receive the unpolarized light along an edge of the light guide; and the angular reduction film includes a plurality of angular reduction film grooves that extend in a direction that is substantially orthogonal to the edge of the light guide.

In Example 3, the projection display system of any one of Examples 1-2 can optionally be configured such that an angular reduction film groove of the plurality of angular reduction film grooves has a cross-section, taken orthogonal to the direction of the angular reduction film grooves, that includes a first linear segment that extends to a second linear segment.

In Example 4, the projection display system of any one of Examples 1-3 can optionally be configured such that: the LED is a first LED configured to emit light at a first wavelength; and the system further comprises a second LED configured to emit light at a second wavelength different from the first wavelength.

In Example 5, the projection display system of any one of Examples 1-4 can optionally further include a controller configured to electrically power the first LED and the second LED with a selectable power ratio to control a color temperature of the polarized light beam.

In Example 6, the projection display system of any one of Examples 1-5 can optionally be configured such that the plurality of light-extraction features includes a plurality of light-extraction grooves disposed on the opposing surface of the light guide and configured to reflect at least some of the guided light to form at least some of the unpolarized emitted light.

In Example 7, the projection display system of any one of Examples 1-6 can optionally be configured such that: the light guide is configured to receive the unpolarized light along an edge of the light guide; and the light-extraction grooves extend in a direction that is substantially parallel to the edge of the light guide.

In Example 8, the projection display system of any one of Examples 1-7 can optionally be configured such that a light-extraction groove of the plurality of light-extraction grooves has a cross-section, taken orthogonal to the direction of the light-extraction grooves, that includes a first linear segment that extends to a second linear segment.

In Example 9, the projection display system of any one of Examples 1-8 can optionally be configured such that the plurality of light-extraction features includes a plurality of anisotropic scattering particles located within an interior of the light guide and configured to anisotropically scatter at least some of the guided light to form at least some of the unpolarized emitted light.

In Example 10, the projection display system of any one of Examples 1-9 can optionally be configured such that: at least some of the guided light exits the light guide through the opposing surface to form errant light; and the system further comprises a reflector configured to reflect at least some of the errant light into the light guide through the opposing surface of the light guide.

In Example 11, the projection display system of any one of Examples 1-10 can optionally further include: a polarization-modulating panel including an array of pixels, each pixel configured to modulate a polarization state of a corresponding portion of the polarized light beam to form a polarization-modulated beam; and a polarizer configured to convert the polarization-modulated beam to an intensity-modulated beam.

In Example 12, the projection display system of any one of Examples 1-11 can optionally be configured such that: the polarization-modulating panel is configured to operate in reflection; and the polarizer comprises a beamsplitter disposed in an optical path between the angular reduction film and the polarization-modulating panel.

In Example 13, the projection display system of any one of Examples 1-12 can optionally be configured such that the polarization-modulating panel is configured to operate in transmission, such that the polarization-modulating panel is disposed in an optical path between the angular reduction film and the polarizer.

In Example 14, the projection display system of any one of Examples 1-13 can optionally further include: a lens configured to at least partially focus the polarized light beam; and an actuator configured to vary a spacing between the lens and the polarization-modulating panel to adjust a focus of the projection display system.

In Example 15, a method for operating a projection display system can include: generating unpolarized light with a first light-emitting diode (LED); receiving the unpolarized light with a light guide from a perimeter of the light guide; guiding the received unpolarized light, as guided light, between a light emission surface of the light guide and an opposing surface of the light guide; directing, with a plurality of light-extraction features in or on the light guide, a portion of the guided light out of the light guide through the light emission surface as unpolarized emitted light; reflecting, with a polarizing film, at least some of a first polarization state of the unpolarized emitted light into the light guide through the light emission surface; transmitting, with the polarizing film, at least some of a second polarization state, orthogonal to the first polarization state, of the unpolarized emitted light through the polarizing film to form a polarized light beam; and reducing, with an angular reduction film, a range of propagation angles of the polarized light beam.

In Example 16, the method of Example 15 can optionally be configured such that: the LED is a first LED that emits light at a first wavelength; and the method further includes emitting, with a second LED, light at a second wavelength different from the first wavelength.

In Example 17, the method of any one of Examples 15-16 can optionally further include electrically powering, with a controller, the first LED and the second LED with a selectable power ratio to control a color temperature of the polarized light beam.

In Example 18, a projection display system can include: a first light-emitting diode (LED) and a second LED configured to generate unpolarized light, the first LED configured to emit light at a first wavelength, the second LED configured to emit light at a second wavelength different from the first wavelength; a polarizing film configured to: reflect at least some of a first polarization state of the unpolarized light; and transmit at least some of a second polarization state, orthogonal to the first polarization state, of the unpolarized light through the polarizing film to form a polarized light beam; an angular reduction film configured to reduce a range of propagation angles of the polarized light beam, the angular reduction film including a plurality of angular reduction film grooves; a polarization-modulating panel including an array of pixels, each pixel configured to modulate a polarization state of a corresponding portion of the polarized light beam to form a polarization-modulated beam; and a polarizer configured to convert the polarization-modulated beam to an intensity-modulated beam.

In Example 19, the projection display system of Example 18 can optionally further include a controller configured to electrically power the first LED and the second LED with a selectable power ratio to control a color temperature of the polarized light beam.

In Example 20, the projection display system of any one of Examples 18-19 can optionally further include: a lens configured to at least partially focus the polarized light beam; and an actuator configured to vary a spacing between the lens and the polarization-modulating panel to adjust a focus of the projection display system.

What is claimed is:

1. A projection display system, comprising:
    a light-emitting diode (LED) configured to generate unpolarized light;
    a light guide having a light emission surface and an opposing surface opposite the light emission surface, the light guide configured to receive the unpolarized light from a perimeter of the light guide and guide the unpolarized light between the light emission surface and the opposing surface as guided light, the light guide including a plurality of light-extraction features that are configured to direct a portion of the guided light out of the light guide through the light emission surface as unpolarized emitted light;
    a polarizing film configured to:
        reflect at least some of a first polarization state of the unpolarized emitted light into the light guide through the light emission surface; and
        transmit at least some of a second polarization state, orthogonal to the first polarization state, of the unpolarized emitted light through the polarizing film to form a polarized light beam;
    an angular reduction film configured to receive the polarized light beam and reduce a range of propagation angles of the polarized light beam;
    a polarization-modulating panel configured to operate in reflection and including an array of pixels, each pixel configured to modulate a polarization state of a corresponding portion of the polarized light beam to form a polarization-modulated beam; and
    a polarizer configured to convert the polarization-modulated beam to an intensity-modulated beam, the polarizer comprising a beamsplitter disposed in an optical path between the angular reduction film and the polarization-modulating panel.

2. The projection display system of claim 1, wherein:
    the light guide is configured to receive the unpolarized light along an edge of the light guide; and
    the angular reduction film includes a plurality of angular reduction film grooves that extend in a direction that is substantially orthogonal to the edge of the light guide.

3. The projection display system of claim 2, wherein an angular reduction film groove of the plurality of angular reduction film grooves has a cross-section, taken orthogonal to the direction of the angular reduction film grooves, that includes a first linear segment that extends to a second linear segment.

4. The projection display system of claim 1, wherein:
    the LED is a first LED configured to emit light at a first wavelength; and
    the system further comprises a second LED configured to emit light at a second wavelength different from the first wavelength.

5. The projection display system of claim 4, further comprising a controller configured to electrically power the first LED and the second LED with a selectable power ratio to control a color temperature of the polarized light beam.

6. The projection display system of claim 1, wherein the plurality of light-extraction features includes a plurality of light-extraction grooves disposed on the opposing surface of the light guide and configured to reflect at least some of the guided light to form at least some of the unpolarized emitted light.

7. The projection display system of claim 6, wherein:
    the light guide is configured to receive the unpolarized light along an edge of the light guide; and
    the light-extraction grooves extend in a direction that is substantially parallel to the edge of the light guide.

8. The projection display system of claim 7, wherein a light-extraction groove of the plurality of light-extraction grooves has a cross-section, taken orthogonal to the direction of the light-extraction grooves, that includes a first linear segment that extends to a second linear segment.

9. The projection display system of claim 1, wherein the plurality of light-extraction features includes a plurality of anisotropic scattering particles located within an interior of the light guide and configured to anisotropically scatter at least some of the guided light to form at least some of the unpolarized emitted light.

10. The projection display system of claim 1, wherein:
    at least some of the guided light exits the light guide through the opposing surface to form errant light; and
    the system further comprises a reflector configured to reflect at least some of the errant light into the light guide through the opposing surface of the light guide.

11. The projection display system of claim 1, further comprising:
    a lens configured to at least partially focus the polarized light beam; and
    an actuator configured to vary a spacing between the lens and the polarization-modulating panel to adjust a focus of the projection display system.

12. A method for operating a projection display system, the method comprising:
    generating unpolarized light with a first light-emitting diode (LED);
    receiving the unpolarized light with a light guide from a perimeter of the light guide;
    guiding the received unpolarized light, as guided light, between a light emission surface of the light guide and an opposing surface of the light guide;
    directing, with a plurality of light-extraction features in or on the light guide, a portion of the guided light out of the light guide through the light emission surface as unpolarized emitted light;
    reflecting, with a polarizing film, at least some of a first polarization state of the unpolarized emitted light into the light guide through the light emission surface;
    transmitting, with the polarizing film, at least some of a second polarization state, orthogonal to the first polarization state, of the unpolarized emitted light through the polarizing film to form a polarized light beam;
    receiving, with an angular reduction film, the polarized light beam;
    reducing, with the angular reduction film, a range of propagation angles of the polarized light beam;
    modulating, with a polarization-modulating panel operating in reflection and including an array of pixels, polarization states of corresponding portions of the polarized light beam to form a polarization-modulated beam; and converting, with a polarizer comprising a beamsplitter disposed in an optical path between the angular reduction film and the polarization-modulating panel, the polarization-modulated beam to an intensity-modulated beam.

13. The method of claim 12, wherein:
the LED is a first LED that emits light at a first wavelength; and
the method further comprises emitting, with a second LED, light at a second wavelength different from the first wavelength.

14. The method of claim 13, further comprising electrically powering, with a controller, the first LED and the second LED with a selectable power ratio to control a color temperature of the polarized light beam.

15. A projection display system, comprising:
a first light-emitting diode (LED) and a second LED configured to generate unpolarized light, the first LED configured to emit light at a first wavelength, the second LED configured to emit light at a second wavelength different from the first wavelength;
a polarizing film configured to:
reflect at least some of a first polarization state of the unpolarized light; and
transmit at least some of a second polarization state, orthogonal to the first polarization state, of the unpolarized light through the polarizing film to form a polarized light beam;
an angular reduction film configured to receive the polarized light beam and reduce a range of propagation angles of the polarized light beam, the angular reduction film including a plurality of angular reduction film grooves;
a polarization-modulating panel configured to operate in reflection and including an array of pixels, each pixel configured to modulate a polarization state of a corresponding portion of the polarized light beam to form a polarization-modulated beam; and
a polarizer configured to convert the polarization-modulated beam to an intensity-modulated beam, the polarizer comprising a beamsplitter disposed in an optical path between the angular reduction film and the polarization-modulating panel.

16. The projection display system of claim 15, further comprising a controller configured to electrically power the first LED and the second LED with a selectable power ratio to control a color temperature of the polarized light beam.

17. The projection display system of claim 15, further comprising:
a lens configured to at least partially focus the polarized light beam; and
an actuator configured to vary a spacing between the lens and the polarization-modulating panel to adjust a focus of the projection display system.

* * * * *